Figure 1:
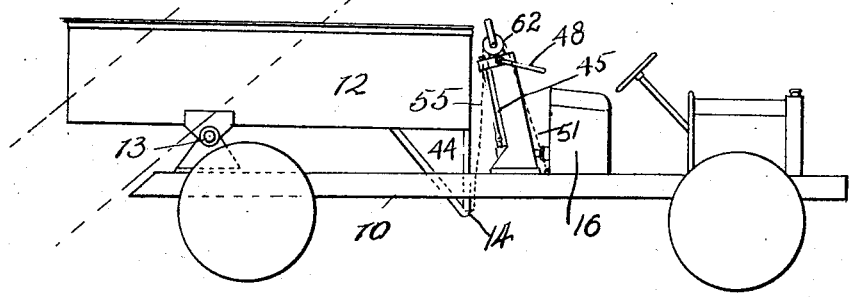

Dec. 6, 1927.

P. E. BARKER 1,651,988

DUMPING MECHANISM FOR MOTOR TRUCKS

Original Filed Dec. 10, 1919   2 Sheets-Sheet 1

Inventor
Percy E. Barker
by Thurston Kwis & Hudson
Attorneys

Dec. 6, 1927.
P. E. BARKER
1,651,988
DUMPING MECHANISM FOR MOTOR TRUCKS
Original Filed Dec. 10, 1919    2 Sheets-Sheet 2
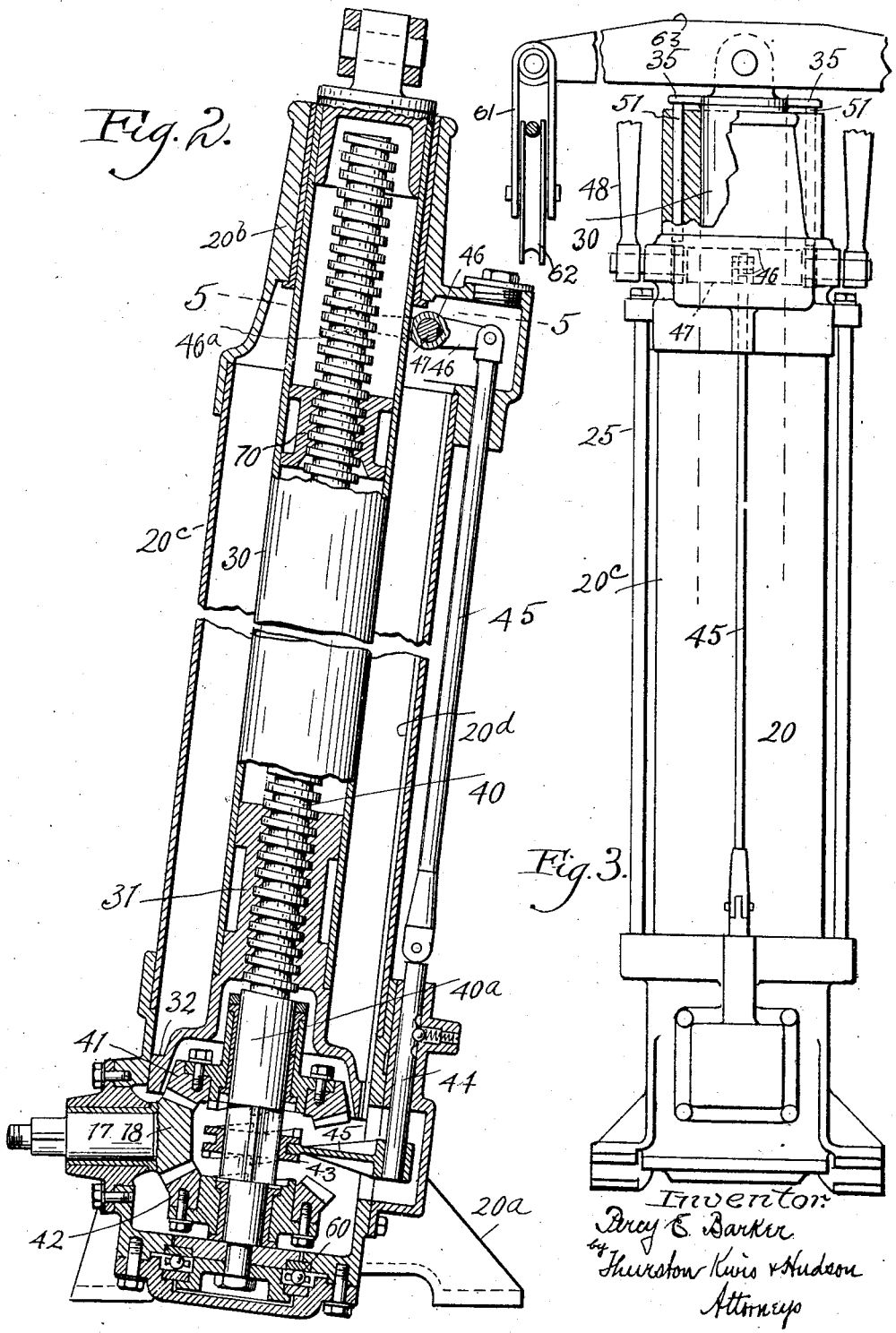

Patented Dec. 6, 1927.

1,651,988

UNITED STATES PATENT OFFICE.

PERCY E. BARKER, OF CLEVELAND, OHIO, ASSIGNOR TO THE VAN DORN IRON WORKS COMPANY, OF CLEVELAND, OHIO, A CORPORATION OF OHIO.

DUMPING MECHANISM FOR MOTOR TRUCKS.

Application filed December 10, 1919, Serial No. 343,878. Renewed December 8, 1922.

This invention relates to certain novel means by which the tilting body of a dumping motor truck may be tilted about its pivotal support and brought into dumping position or allowed to return safely to its load carrying position. The invention is in the nature of an improvement on the mechanism for this purpose which forms the subject matter of my application Serial No. 326,540, filed Sept. 26, 1919.

The objects are to cheapen the construction, to render it more durable and more efficient, to provide simple means by which, without changing the speed of the driving shaft, the body will be tilted to the dumping position at a slower rate than its rate of movement when returning to its normal position.

The invention consists in the construction and combination of parts shown in the drawings as hereinafter described and pointed out definitely in the appended claims.

Figure 4:
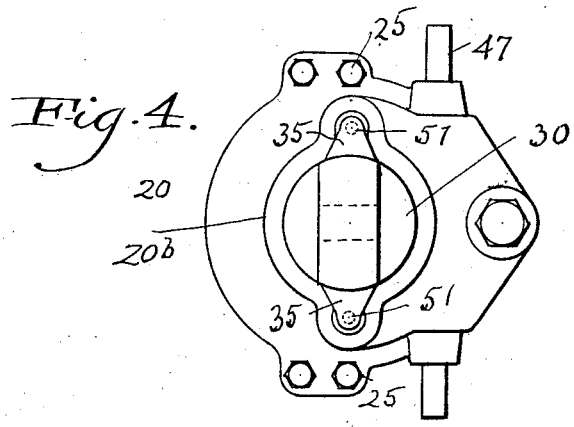
Figure 5:
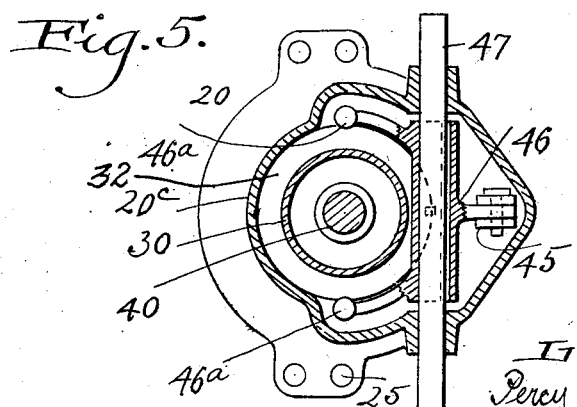

In the drawing, Fig. 1 is a side elevation of a dumping truck equipped with the present invention; Fig. 2 is a side elevation partly sectioned of the operating screw and associated parts; Fig. 3 is a rear elevation of the mechanism shown in Fig. 2; Fig. 4 is a plan view of the mechanism shown in Figs. 1 and 2 with the sheave carrying rocker removed, and Fig. 5 is a sectional plan in the plane of line 5—5 of Fig. 2.

Referring to the parts by reference characters, 10 represents the chassis frame of a motor truck, 12 represents the load carrying body which is tiltably mounted upon said chassis frame, the axis of rotation being indicated by 13. 14 represents the depending bar fixed to the front end of the body to which the tilting cables 55 to be presently described in detail are connected in order that the body tilting mechanism may tilt the body as required.

16 represents the driver's seat; and 17 represents the longitudinally extended horizontal driving shaft for the tilting mechanism. It is to be understood that in practice this shaft has some suitable driving connection with the same motor which is primarily provided for driving the truck; but so far as concerns the present invention it is not material what means are provided for rotating this driving shaft.

The body tilting mechanism which forms the subject matter of the present invention is located between the front end of the body 12 and the driver's seat. The base $20^a$ of the principal frame member 20 is secured to the chassis, and preferably to transverse beams forming part of the chassis frame; and said frame member is slightly inclined rearward from its lower to its upper end. This principal frame member 20 consists of the base $20^a$, the top $20^b$, and an intermediate tubular member $20^c$. The three parts are tied together by external tie rods 25 which engage the base and top of this frame member.

A tubular plunger, represented by 30, is located for most part within the tubular frame member 20, although it projects out of the upper end thereof through a hole in which it is slidably mounted and by which it is guided. A nut 31 is secured in the lower end of this plunger. The lower end of the nut casting projects below the plunger and is enlarged to form a piston 32 which is slidably fitted in the frame member $20^c$. The frame member $20^c$ has an internal longitudinally extended tongue $20^d$; and the piston part of the nut has a groove which slidably fits over this tongue so that, as the plunger and its nut are moved up and down within the frame member, the nut can not rotate. Fig. 2 illustrates clearly how in the lowest position of the hoisting mechanism the depending piston portion 32 of the plunger houses or encloses the hub of the upper gear 41 so that the piston portion 32 travelling in the casing $20^d$ travels down very close to the axis of the horizontal drive shaft, thus giving a long guiding surface for the plunger and widely separated bearing end portions therefor.

A screw 40 screws through the nut 31 and extends axially up through the plunger and normally nearly to the top thereof. The lower end or shank $40^a$ of this screw is unthreaded and has an anti-friction step bearing 60 in the lower end of the base frame. Two bevel gears 41, 42, are respectively mounted to rotate upon the screw shank but are held against longitudinal movement thereon in any suitable mechanical way. The driving shaft 17 projects through the front wall of the base member $20^a$ in a horizontal direction and is rotatably mounted therein, and it carries a bevel gear 18 on its inner end which is always in mesh with the two bevel gears 41, 42. It is to be noted, however, that the axis of these two bevel gears is not at right angles to the axis of the driving shaft, but is inclined thereto. The lower bevel gear 42 has fewer teeth than the upper bevel gear 41. When the driving shaft is rotating these two bevel gears on the screw shank are both rotating, but in opposite directions, and the lower bevel gear is rotating the faster.

Between these two bevel gears there is a sliding clutch sleeve 43 which has a splined connection with the shank of the screw; and the upper and lower faces of this clutch sleeve are fashioned for engagement with the opposed ends of the two bevel gears to respectively connect them with the screw. When the clutch sleeve is moved up it will connect the larger bevel gear 41 with the screw and thereupon the screw will be caused to rotate in that direction which causes the nut 31 and with it the plunger 30 to travel upward. When the clutch sleeve is moved down far enough it will connect the lower bevel gear 42 to the screw, which will thereupon turn in the opposite direction and thereby draw the nut and plunger down. It will, however, turn faster when the gear 42 is connected with the screw without any change in the speed of the driving shaft.

The movement of the clutch sleeve is controlled by a fork arm 45 which is connected with the lower end of a sliding bar 44 mounted in the base of the fixed frame member. This bar is jointed and its upper end passes through a portion of the top of the fixed frame member and has a loose pivotal connection with one arm of a rocking lever 46 which is keyed to a horizontal rock shaft 47 rotatably mounted in the top frame member and having at least one end projecting out of said top in order that an operating lever 48 may be attached to it. One arm of this rocking lever is forked, and the two forks 46ª thereof lie on opposite sides of the screw. Two vertically movable rods 51 are slidably mounted in the top member 20ᵇ, and normally rest at their lower ends respectively upon the two forks 46ª of this lever 46, and may project above the same. In fact, they do so project while the plunger is moving down. The part of the plunger which always projects out of the top frame member 20ᵇ has two lateral extensions 35 which lie over the upper ends of these two rods.

It will be understood that the means through which the plunger is connected with the tilting body may be substantially the same means which are shown for that purpose in my prior application above referred to; that is to say, an equalizer bar 63 may be pivoted to the outer end of the plunger and may extend laterally in both directions therefrom. At its ends it carries respectively two straps 61 in which two sheaves 62 are respectively mounted; two cables 55 run over these two sheaves. Each of these cables is connected at one of its ends to the chassis frame, and at its other end to the bar 14 which is fixed to the tilting body.

Normally, of course, the clutch sleeve is in the neutral position between the two bevel gears 41, 42, upon the screw shank. In order to initiate the tilting movement of the body the operator takes hold of the hand lever 48 and rocks it so as to pull the rod 44. This moves the clutch sleeve 43 up and connects the upper and larger bevel gear 41 with the screw. Thereupon the screw will be rotated, with the result that the nut and the plunger secured thereto will travel upward and thereby, through the described mechanism, the front end of the tilting body will be raised. When this upward movement of the plunger has continued until the body is in the load dumping position parts of the outwardly projecting lower end or piston part 32 of the nut 31 will engage the two forks 46ª of the lever 46, and thereby rock the lever with the result of pushing the rod 44 downward and thereby restoring the clutch sleeve to the neutral position and disconnecting the upper bevel gear. After the load is dumped the operator will now rock the lever 48 in the opposite direction. By so doing the inner forked ends of the lever 46 will be raised, and thereby the rods 51 will be pushed upward so that their upper ends will project out of the top of the frame member. While this is being done the clutch collar will have clutched the lower and smaller bevel gear to the screw shank. Thereupon the screw will be turned in the opposite direction and at a higher rate of speed than before, and without any change in the speed of the driving shaft. By this means the plunger will be drawn down into the frame member and the body allowed to resume its normal position. As the plunger is just arriving at this position, the lateral extensions 35 on the upper end of the plunger will engage the rods and push them down, with the result of rocking the lever 46 and pulling up on the rod and thereby moving the clutch collar to the neutral or clutch releasing position. A sleeve 70, which may have a threaded engagement with the screw 40, is secured in the plunger 30 and acts to hold the screw in the axial working position as long as is necessary or desirable. This guide sleeve prevents chattering or vibration of the screw when the hoist is down with the bed in horizontal position and the truck is travelling along the roadway, as well as preventing like effect during the hoisting movement. Said sleeve is usually located at such an elevation that it leaves and becomes wholly disengaged from the screw during the final hoisting movement and for this reason its screw receiving opening is preferably bevelled at its lower end, as shown in Fig. 2 to center the screw and guide it to proper threading position during downward movement of the hoisting mechanism.

Having described my invention, I claim:—

1. In mechanism of the character described, the combination of a driven rotating screw shank member, a driving shaft member whose axis is at an angle to the axis of said screw shank member, a drive connection between said members including two bevel gears of different sizes mounted upon one of said members, a bevel gear fixed to said other member and operatively associated with said other gears, and means for selectively connecting said first two gears for driving connection with the member upon which they are mounted.

2. In mechanism of the class described, the combination of a tubular frame member, a tabular plunger which is movable in said frame member and is slidable in a guideway through the upper end of said frame member, a nut which is secured to the lower end of said plunger and has a portion which projects below the same, said projection having a sliding splined engagement with said frame member, a feed screw which screws through the nut into the tubular plunger, and means for effecting direct and reverse operations of said screw.

3. In mechanism of the class described, the combination of a tubular frame member, a tubular plunger which is movable in said frame member and is slidable through a guideway in the upper end of said frame member, a nut fixed to said plunger, a rotatable screw which screws through said nut and projects into said plunger, a driving shaft, a gear combination and a sliding clutch for selectively effecting direct and reverse operation of said screw by said drive shaft, a sliding rod, a clutch operating arm secured thereto, a rock lever pivoted to the frame member adjacent the upper end thereof and having one arm to which the upper end of said rod is connected and a second arm which projects into the hollow frame member, a push rod slidably mounted in the upper end of the frame member and located in such position that its lower end lies in operative position above the second arm of said rock lever, and means provided upon the upper and lower ends of said plunger respectively, for actuating the second arm of said rock lever.

4. In mechanism of the character described, the combination of a tubular frame member, a tubular plunger which is movable in said frame member and is slidable through a guideway in the upper end of said frame member, a nut fixed to said plunger, a rotatable screw which has a bearing on the frame member and screws through said nut and projects into said plunger, two bevel gears which are rotatably mounted on the screw shank, a driving shaft, a bevel gear fixed to said driving shaft in mesh with both of the bevel gears first referred to, a sliding clutch on the screw shank between the two first mentioned bevel gears for selectively connecting either of them with the screw shank, a sliding rod, a clutch operating arm secured thereto, engaging with said clutch, a rocking lever which is pivoted to the frame member adjacent the upper end thereof and has one arm to which the upper end of said rod is connected and a second arm which projects into the hollow frame member, a push rod slidably mounted in the upper end of the frame member and located in position such that its lower end lies in operative position above the second arm of said rocking lever, a lateral projection upon the upper end of the plunger aligned with said push rod, and a tappet surface provided upon the lower end of the plunger arranged to engage the second arm of the said rocking lever.

5. In mechanism of the class described, the combination of a substatially horizontal driving shaft member, a nearly vertical driven screw shank member, bevel gears connecting said members for rotation of the screw shank member in opposite directions and including a gear and hub surrounding the screw shank member and lying above the horizontal driving shaft member, a tubular frame member surrounding the screw shaft member, and a plunger within said tubular frame member having a nut at its lower end provided with a downwardly projecting portion sliding in the tubular frame member and which in the lowest position of the plunger surrounds the gear and hub on the screw shaft member.

6. In mechanism of the class described, the combination of a driving shaft member and a driven screw shank member nearly at right angles to each other, bevel gears connecting said member for rotation of the screw shank member in either direction, a tubular frame member, a hollow plunger larger than the screw member and having sliding engagement with the tubular frame member, said plunger at its lower end having a nut traveling on said screw shank and above the same being provided with a guiding sleeve travelling along the free upper end of the screw for preventing vibration thereof, said sleeve being so located as to move out of engagement with the screw when the hoist is fully elevated, and the lower portion of the opening in said sleeve being bevelled to guide the screw into the sleeve as the plunger moves downwardly.

In testimony whereof, I hereunto affix my signature.

PERCY E. BARKER.